Jan. 1, 1952  C. J. COBERLY  2,580,657
PILOT-CONTROLLED DISTRIBUTING VALVE FOR FLUID-OPERATED MOTORS
Filed March 18, 1946  6 Sheets-Sheet 1

INVENTOR:
CLARENCE J. COBERLY,
By
HARRIS, KIECH, FOSTER & HARRIS.

FOR THE FIRM
ATTORNEYS

Jan. 1, 1952 C. J. COBERLY 2,580,657
PILOT-CONTROLLED DISTRIBUTING VALVE FOR FLUID-OPERATED MOTORS
Filed March 18, 1946 6 Sheets-Sheet 2
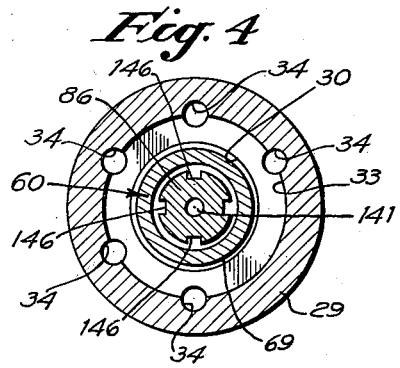
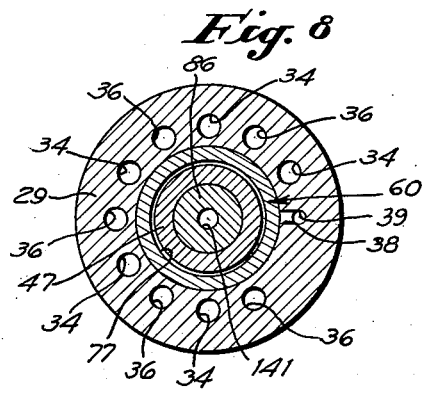
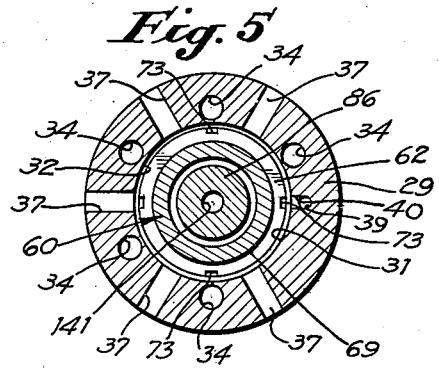
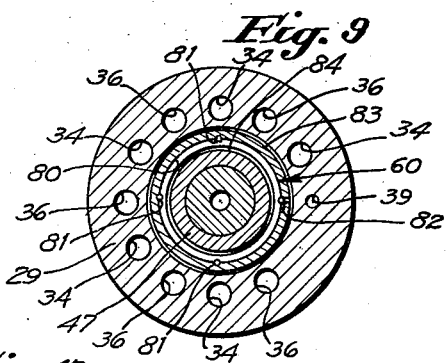
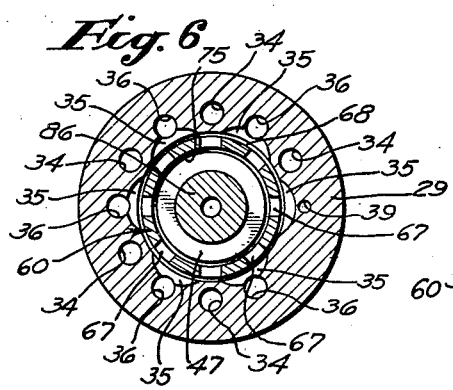
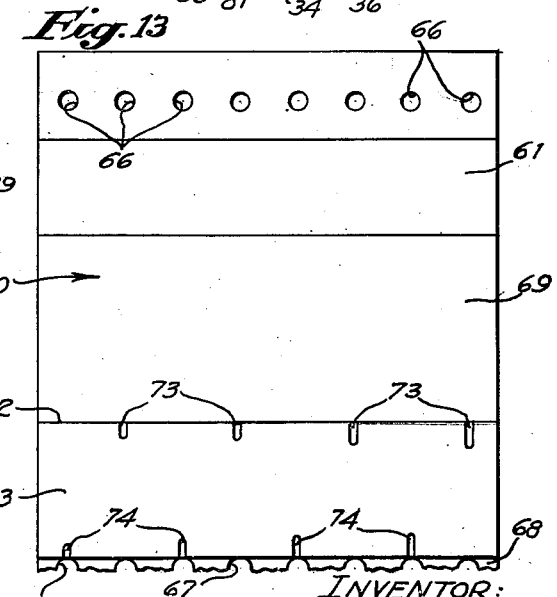
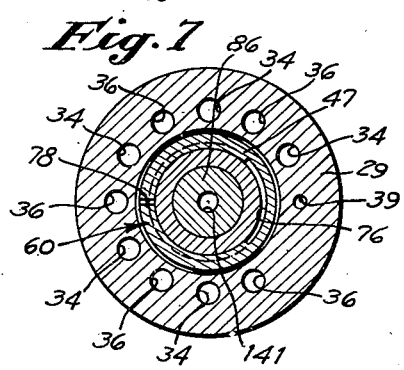
INVENTOR:
CLARENCE J. COBERLY,
By HARRIS, KIECH, FOSTER & HARRIS,
FOR THE FIRM
ATTORNEYS Jan. 1, 1952   C. J. COBERLY   2,580,657
PILOT-CONTROLLED DISTRIBUTING VALVE FOR FLUID-OPERATED MOTORS
Filed March 18, 1946   6 Sheets-Sheet 3

INVENTOR:
CLARENCE J. COBERLY,
By HARRIS, KIECH, FOSTER & HARRIS,
FOR THE FIRM
ATTORNEYS

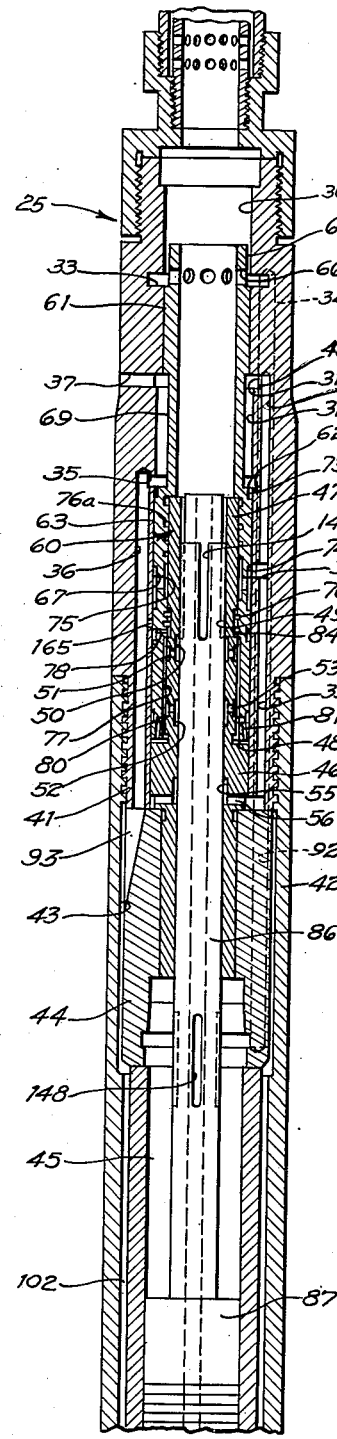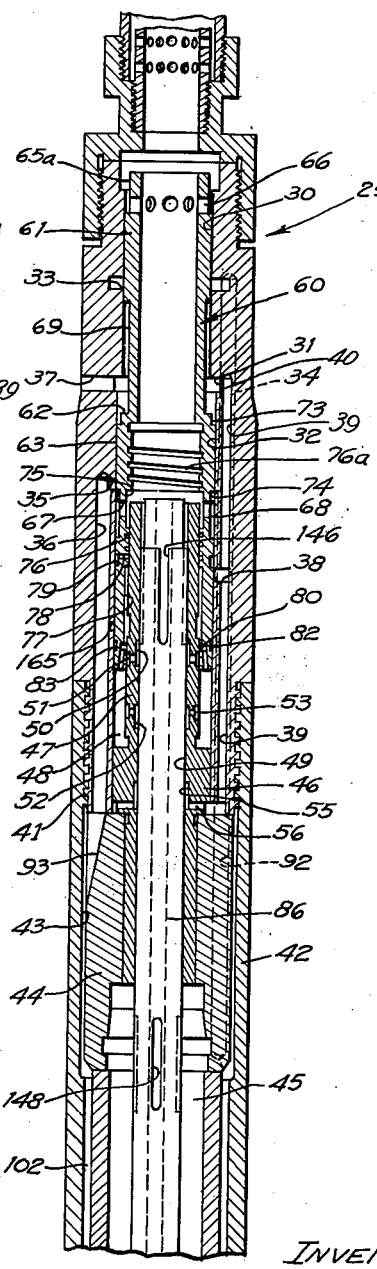

Jan. 1, 1952 — C. J. COBERLY — 2,580,657
PILOT-CONTROLLED DISTRIBUTING VALVE FOR FLUID-OPERATED MOTORS
Filed March 18, 1946 — 6 Sheets-Sheet 5
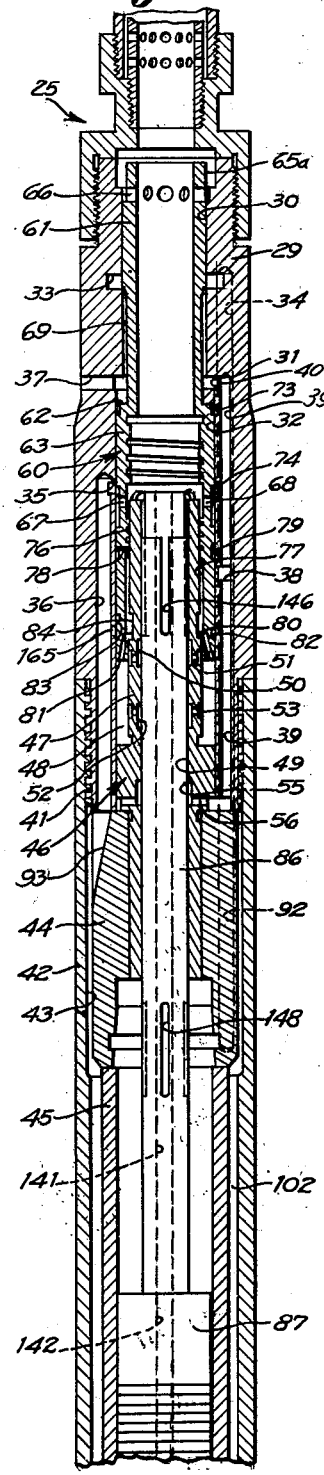
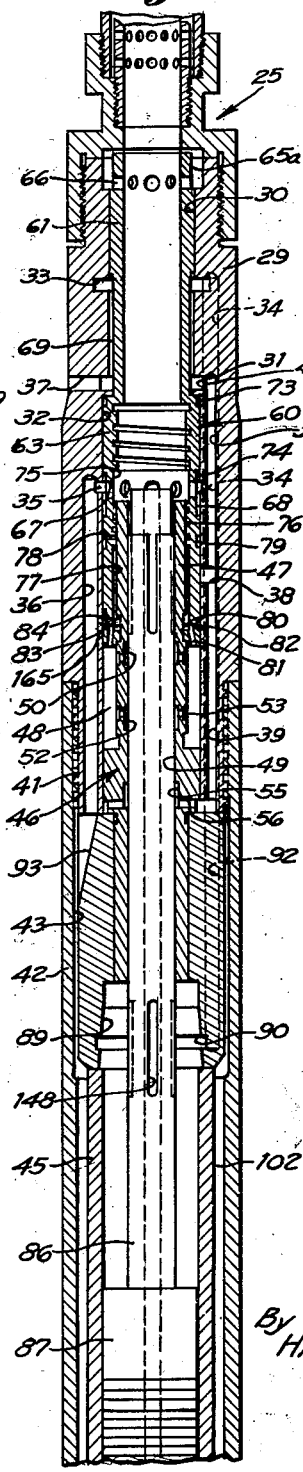
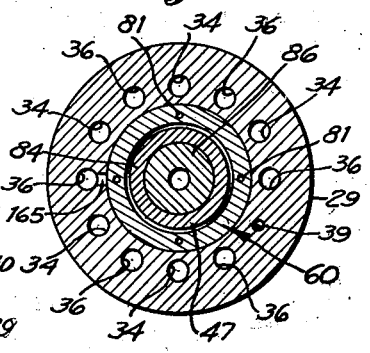
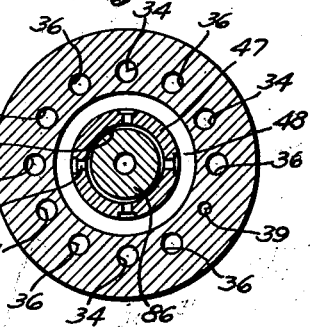
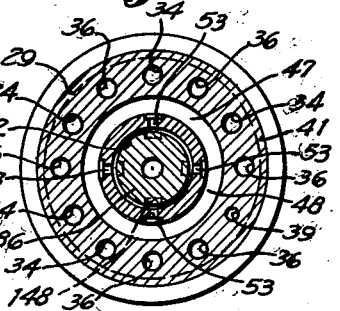
INVENTOR:
CLARENCE J. COBERLY,
By HARRIS, KIECH, FOSTER & HARRIS,
FOR THE FIRM
ATTORNEYS Jan. 1, 1952  C. J. COBERLY  2,580,657
PILOT-CONTROLLED DISTRIBUTING VALVE FOR FLUID-OPERATED MOTORS
Filed March 18, 1946  6 Sheets-Sheet 6
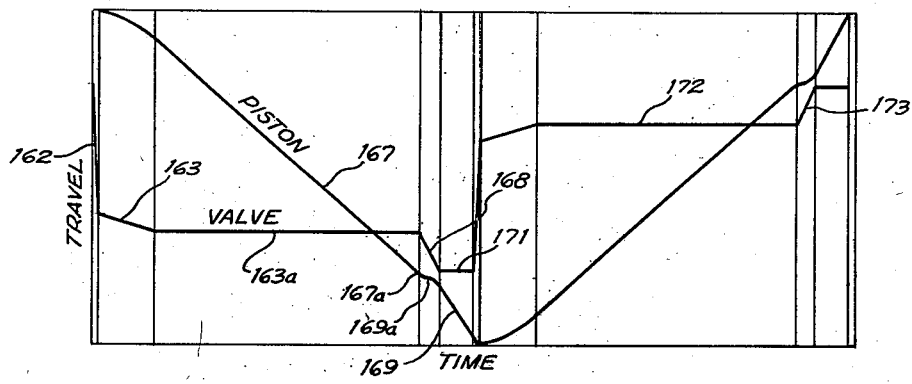
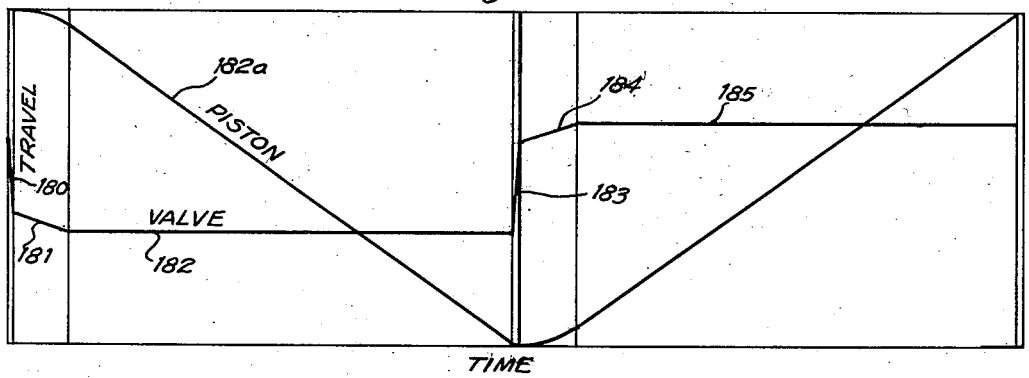
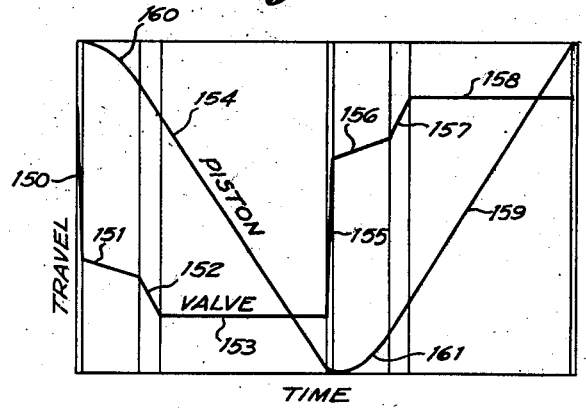
INVENTOR:
CLARENCE J. COBERLY,
BY HARRIS, KIECH, FOSTER & HARRIS,
FOR THE FIRM
ATTORNEYS Patented Jan. 1, 1952

2,580,657

UNITED STATES PATENT OFFICE 2,580,657

PILOT-CONTROLLED DISTRIBUTING VALVE FOR FLUID-OPERATED MOTORS

Clarence J. Coberly, Los Angeles, Calif., assignor, by mesne assignments, to Dresser Equipment Company, Cleveland, Ohio, a corporation of Ohio Application March 18, 1946, Serial No. 655,329

17 Claims. (Cl. 121—157)

My invention relates to a fluid-operated motor and, more particularly, to such a device having a reciprocating motor piston in which the velocity of the motor piston is automatically controlled when the working load on such piston is reduced below a predetermined value.

This invention is an improvement on the device disclosed in my earlier Patent No. 2,311,157, issued February 16, 1943, to which reference is hereby made for a detailed discussion of the problem in the art.

Although my invention is of particular utility in the oil industry in combination with a pump for pumping oil from a well, and for the purpose of illustration is described in connection with such use, it will be apparent to those skilled in the art that it is susceptible of other and different uses, and, consequently, I do not intend to be limited to the particular use described.

In general, in the oil industry it is common practice to use a fluid-operated pump in pumping oil from a well, such a pump generally comprising a coupled motor and pump combination set in the well at the level from which it is desired to pump the oil. In such a pumping device, the motor is normally actuated by admitting operating fluid, such as oil, under relatively high pressure alternately to opposite ends of a motor piston to reciprocate the same, the reciprocation of the motor piston being suitably communicated to a pump piston in the pump end of the device so as to pump oil from the well. In order to conduct operating fluid alternately to opposite ends of the motor piston, a main valve mechanism is ordinarily employed, such as is shown in my said Patent No. 2,311,157, and the present invention has the same objects specified in said patent and additional objects as will appear hereinafter.

The governing valve construction disclosed in said Patent No. 2,311,157, as pointed out therein, is adapted to prevent the motor and pump pistons of a fluid-operated pump from racing at excessive speeds when the pump working load drops below a predetermined percentage of its normal operating value. However, in the embodiment described in said patent, with such a reduction in pump load, the pistons could speed up somewhat, as illustrated in Fig. 22 thereof, to a controlled but higher rate of speed than utilized in normal pumping. With the prior device, the increase in speed permitted was as high as 50% greater than the normal piston speed; and I have found that even such a controlled increase in piston speed may be excessive in certain deep well pumping installations. Consequently, it is a primary object of this invention to provide a governing valve for such a pump which, upon any reduction in pump working load, will maintain the piston speed at or below its normal operating speed during the period in which the pump load is reduced. I have found it to be very desirable to reduce substantially the piston speed during such period, e. g., to only one-half its normal speed, and this is a further object of my invention.

The valve construction disclosed in my prior Patent No. 2,311,157 has a further difficulty in some well installations. As will be noted from a study thereof, a port is provided therein directly connecting the interior of the valve mechanism with the space surrounding the pump through which the production flow from the well passes upwardly to the surface of the ground from the pump. Where the pump is installed in a well in which substantial amounts of sand are carried upwardly with the production flow, such sand sometimes enters the valve port and damages the valve mechanism. It is therefore another object of the present invention to provide, instead of such a direct port, a relatively long and tortuous passage serving the same purpose so far as the valve mechanism is concerned, but which, by reason of its length and character, inhibits the entry of sand into the valve mechanism.

Another disadvantage of the valve mechanism shown in my Patent No. 2,311,157 is that it can, under some conditions of operation, occasionally stop on dead center so as to stop operation, which is undesirable. It is another object of the present invention to provide a valve of this type in which the passages and ports are so arranged that it cannot in any event stop on dead center during operation.

Other objects and advantages will be evident from the following specification and the drawings, which are for the purpose of illustration only and in which:

Fig. 4 is a cross-sectional view taken on the line 4—4 of Fig. 1;

Fig. 5 is a cross-sectional view taken on the line 5—5 of Fig. 1;

Fig. 6 is a cross-sectional view taken on the line 6—6 of Fig. 1;

Fig. 7 is a cross-sectional view taken on the line 7—7 of Fig. 1;

Fig. 8 is a cross-sectional view taken on the line 8—8 of Fig. 1;

Fig. 9 is a cross-sectional view taken on the line 9—9 of Fig. 1;

Fig. 10 is a cross-sectional view taken on the line 10—10 of Fig. 1;

Fig. 11 is a cross-sectional view taken on the line 11—11 of Fig. 1;

Fig. 12 is a cross-sectional view taken on the line 12—12 of Fig. 1;

Fig. 13 is a view showing the outer surface of the main valve of my invention projected onto a vertical plane;

Fig. 17 is a vertical sectional view of my invention, showing the main valve in another position of operation;

Fig. 18 is a vertical sectional view of my invention, showing the main valve in another position of operation;

Fig. 19 is a vertical sectional view of my invention, showing the main valve in another position of operation;

Fig. 20 is a vertical sectional view of my invention, showing the main valve in another position of operation;

Fig. 21 is a chart illustrating the valve and piston motion as a function of time when the pump is completely filled with liquid and the valve is arranged to govern in a position to give one-half speed at full pressure;

Fig. 22 is a chart showing the operation of my invention when the pump cylinder contains only about 15% solid fluid operating at one-half speed at full pressure; and Fig. 23 is a chart showing the operation of my invention when the pump cylinder contains no solid fluid but 100% gas, operating at one-half speed at full pressure.

Figure 1:
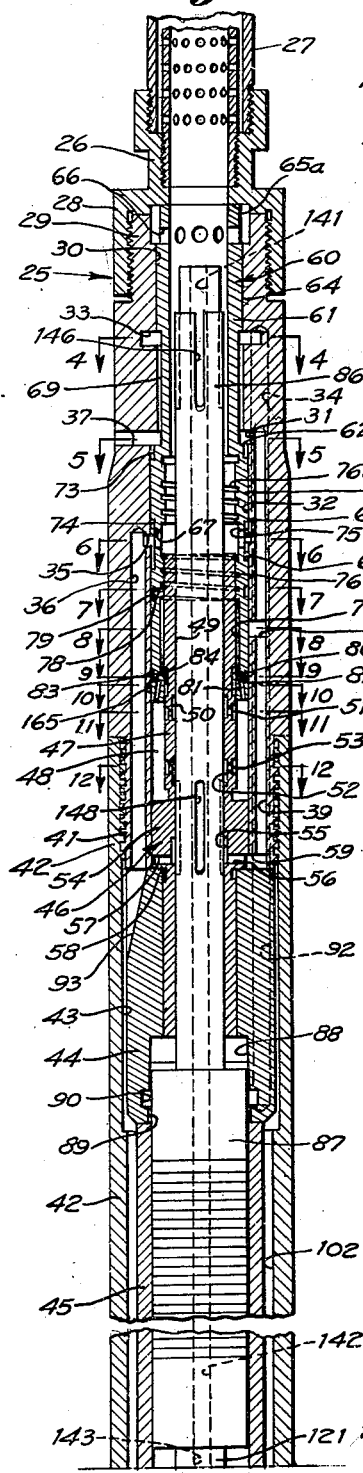
Fig. 1 is a vertical sectional view of the motor and main valve of my invention.
Figure 2:
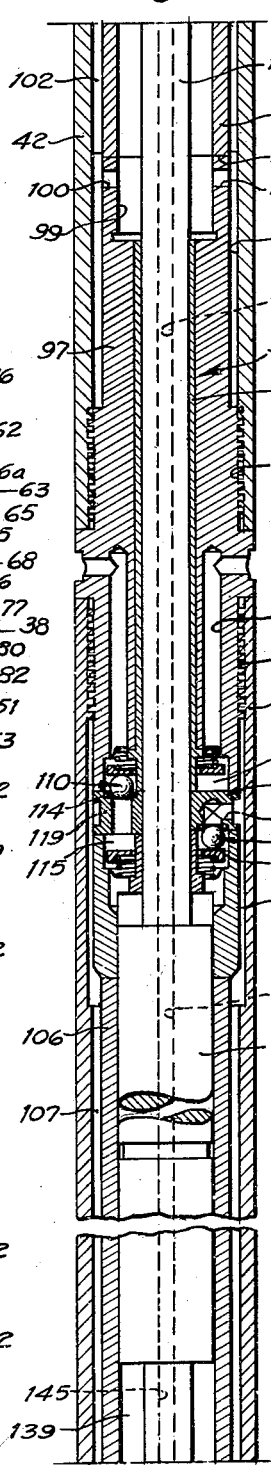
Fig. 2 is a vertical sectional view of my invention, carried downwardly from the lower end of Fig. 1.
Figure 3:
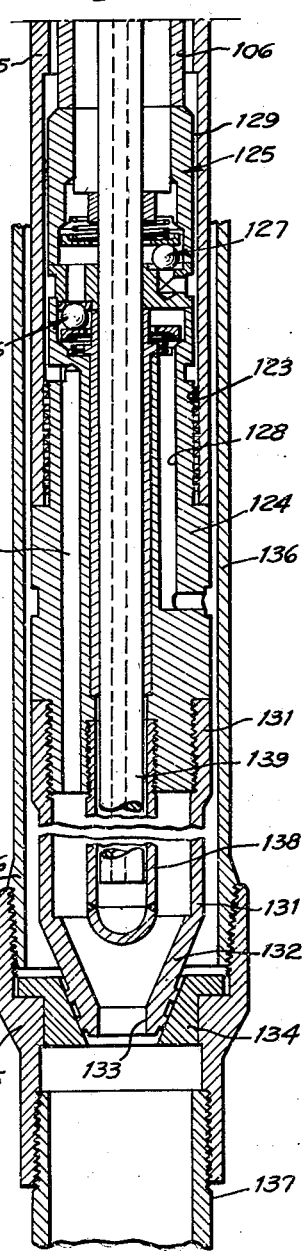
Fig. 3 is a vertical sectional view of my invention, carried downwardly from the lower end of Fig. 2.

Referring to the drawings, Figs. 1, 2, and 3 show a fluid-operated pump 25 having an upper fitting 26 by which the fluid-operated pump is secured to the lower end of a fluid supply tubing 27 by which operating fluid under relatively high pressure is delivered to the motor section of the fluid-operated pump. The fitting 26 has an internally threaded portion 28 adapted to receive the upper threaded end of a valve body 29. The valve body 29 has an axial minor bore 30 formed in the upper part thereof, which is separated by a circular channel 31 from a major bore 32 axially formed in the lower portion of the valve body 29.

Substantially intermediate between the ends of the minor bore 30 is an upper circular channel 33 which intersects the upper ends of primary fluid passages 34, best shown in Fig. 4, such fluid passages extending within the wall of the valve body 29 to the lower end thereof. Spaced below the channel 31 in the major bore 32 is a fluted annular channel 35, the flutes of which intersect with the upper ends of secondary fluid passages 36, as best shown in Fig. 6, each of which extends longitudinally to the lower end of the valve body 29, the secondary fluid passages 36 being spaced between the primary fluid passages 34.

Connecting the circular channel 31 with the exterior of the valve body 29 are a plurality of circumferentially spaced motor discharge ports 37, and an upper valve discharge port 38 is provided in the wall of the valve body 29. Extending upwardly from the bottom of the valve body 29 is a valve exhaust passage 39, best shown in Figs. 1, 8, 11, and 12, the exhaust passage being disposed between two of the secondary fluid passages 36, the passage 39 also being intersected by the upper valve discharge port 38, as best shown in Fig. 8, and connecting at its upper end through a radial port 40 with the channel 31, as best shown in Fig. 5.

The lower end of the valve body 29 is provided with a threaded portion 41 to which is threaded the upper end of a motor cylinder 42. The motor cylinder 42 is provided at its upper end with a counterbored annular chamber 43 in which is disposed a plug body 44 held in fluid-tight engagement with the lower end of the valve body 29 and in fluid-tight engagement with the upper end of a motor cylinder liner 45 when the parts are assembled as shown in Fig. 1. Mounted in the upper part of the plug body 44 is a valve liner 46 having an upper sleeve portion 47 extending upwardly within the major bore 32 of the valve body 29 to a point a short distance below the fluted annular channel 35, there being an annular space 48 formed within the major bore 32 around the upper sleeve portion 47 of the valve liner 46. The valve liner 46 is provided with an axial bore 49 therethrough, in which is formed an annular channel 50 communicating through a plurality of upper liner ports 51 with the annular space 48 when the parts are in the position shown in Fig. 1. Below the channel 50 in the bore 49 of the valve liner 46 is an annular channel 52 which communicates through a plurality of intermediate liner ports 53 with the annular space 48. A collar 54 is formed on the valve liner 46 in a position to rest upon the upper end of the plug body 44, the outer periphery of the collar 54 making a fluid-tight fit with the lower end of the major bore 32. In the bore 49 of the valve liner 46, below the annular channel 52, is formed a lower annular channel 55 which communicates through a plurality of lower liner ports 56 in the wall of the valve liner 46 with an annular space 57 surrounding a lower reduced portion 58 of the collar 54, the space 57 communicating through a radial opening 59 in the lower end of the valve body 29 with the valve exhaust passage 39.

Slidable within the valve body 29 is a main valve member 60 which is of tubular form and which has an upper minor portion 61 which is separated by an annular shoulder 62 from a lower major portion 63. The minor portion 61 of the valve member 60 is of a smaller diameter than the major portion 63 thereof and has an external surface 64 which forms a substantially fluid-tight sliding fit in the minor bore 30 of the valve body 29. The major portion 63 of the valve member 60 has an external surface 65 which forms a substantially fluid-tight sliding fit with the major bore 32 of the valve body 29, the major portion of the valve member extending downwardly into the annular space 48 between the major bore and the external surface of the valve sleeve 47. The uppermost part of the minor portion 61 of the valve member 60 is reduced in diameter to provide an annular channel 65a therearound in which are upper inlet ports 66, and in the major portion 63 are lower inlet ports 67 which communicate with an annular channel 68 formed on the exterior of the valve member. Formed on the external surface of the minor portion 61 of the valve member 60 is an annular channel 69 which, when the valve member is in the position shown in Fig. 1, communicates between the circular channel 33 and the motor discharge ports 37. As best shown in Fig. 13, formed in the external surface of the major portion 63 of the valve member 60 are vertical channels 73 which, as shown in Figs. 1 and 13, communicate with the annular channel 69. Likewise, vertical channels 74 are formed in the major portion 63 of the valve member 60 and communicate with the lower inlet ports 67 through the channel 68. The channels comprising each of the sets of vertical channels 73 and 74 are of varying lengths, as illustrated in Fig. 13, for a purpose to be described hereinafter.

Formed in the bore of the major portion 63 of the valve member 60 is an annular channel 75 communicating with the lower inlet ports 67. Also formed in the major portion 63 is a helical passage 76 of relatively small cross-sectional area which communicates between the annular channel 75 and a wide annular channel 77 therebelow. In between the threads of the lower end of the helical passage 76 is an upper governing port 78 which communicates with a circular channel 79 formed on the exterior surface of the major portion 63 of the valve member 60. At the lower end of the wide annular channel 77 is a circular channel 80 which communicates with the annular space 48 below the valve member 60 through longitudinal valve passages 81, and which also communicates through a lower governing port 82 with a circular channel 83 formed in the outer surface of the major portion 63 of the valve member. Formed in the outer surface of the upper sleeve portion 47 of the valve liner 46, above the upper liner port 51, is an annular channel 84, and communicating between one of the secondary passages 36 and the interior of the major bore 32 of the valve body 29 is an outer governing port 165.

Slidable within the bore of the valve liner 46 in fluid-tight relation therewith, and movable within the bore of the valve member 60 in spaced relation thereto, is a pilot rod 86, the lower end of which is connected to the upper end of a motor piston 87 adapted to be reciprocated within the motor cylinder liner 45 of the motor cylinder 42. A cavity 88 formed in the lower end of the plug body 44 constitutes a continuation of the bore of the cylinder liner 45, and is provided with an inwardly tapered wall portion 89 having an annular channel 90 formed therein which intersects the lower ends of a plurality of vertical passages 92 formed in the plug body 44, each of the vertical passages 92 being axially aligned with the primary passages 34, the upper end of each of the vertical passages 92 registering with the lower end of one of the primary passages 34. The cavity 88 above the annular channel 90 forms a dashpot chamber for holding a body of fluid to stop the upward movement of the power piston 87 with a cushioning effect, as is well known in the art. As will be noted, the secondary fluid passages 36, which lead downwardly from the fluted annular channel 35, connect with fluid passages 93 having the form of grooves in the external face of the plug body 44, the lower end thereof communicating with the annular chamber 43.

As shown in Fig. 2, the lower end of the motor cylinder 42 is connected by threads 95 to an intermediate plug 96 which has an upwardly extending tubular projection 97, the upper end of which engages the lower end 98 of the cylinder liner 45 in fluid-tight engagement. In the upper end of the tubular projection 97 is a dashpot cavity 99 for a purpose similar to that of the cavity 88, the upper end of the dashpot cavity 99 communicating through lower motor cylinder ports 100 with an annular space 101 around the tubular projection 97 and within the motor cylinder 42, the upper end of which communicates, as shown in Fig. 1, through longitudinal passages 102 formed between the motor cylinder 42 and the cylinder liner 45 with the lower end of the annular chamber 43.

The lower portion of the intermediate plug 96 is provided with external threads 104, to which is threaded the upper end of a pump cylinder 105 having a cylinder liner 106 therein, similarly to the motor cylinder 42 with its liner 45 therein, vertical longitudinal passages 107 being provided between the pump cylinder and the cylinder liner. Disposed between the lower end of the intermediate plug 96 and the upper end of the cylinder liner 106 of the pump cylinder 105 is an upper pump valve device 108 which includes an upper discharge valve 110 and an upper inlet valve 111. The upper discharge valve 110 is housed in a chamber 112 formed in the lower end of the intermediate plug 96, which communicates through upper discharge passages 113 with the exterior of the intermediate plug 96, the upper discharge valve including a spring-held ball member 114 adapted to open inwardly to permit a flow of fluid from the upper end of the cylinder liner 106 therethrough and through the upper discharge passages 113, but preventing a reverse flow. The upper inlet valve 111 is disposed in a chamber 115 provided in a valve cage 116, and includes a spring-held ball member 117 adapted to open downwardly to permit a flow of fluid into the upper end of the cylinder liner 106 through an upper inlet passage 118 formed in a valve ring 119 disposed between the lower end of the intermediate plug 96 and the upper end of the valve cage 116.

An intermediate piston rod 121 extends downwardly from the lower end of the motor piston 87 through a sleeve 120 in the intermediate plug 96 and through the upper pump valve device 108, and has its lower end connected to a pump piston 122, the pump piston being reciprocable in the cylinder liner 106.

As shown in Fig. 3, the lower end of the pump cylinder 105 is provided with internal threads 123 by which the same is connected to a lower plug 124. Between the upper end of the lower plug 124 and the lower end of the cylinder liner 106 is disposed a lower pump valve device 125, which includes a lower discharge valve 126 and a lower inlet valve 127, the lower discharge and inlet valves 126 and 127, respectively, being similar in construction to the upper discharge and inlet valves 110 and 111, respectively. The lower discharge valve 126 communicates with the lower end of the cylinder liner 106 and with a lower discharge passage 128 formed in the lower plug 124, which in turn communicates with the exterior of the plug. The lower inlet valve 127 communicates between the interior of the lower end of the cylinder liner 106 and with a space 129 between the exterior of the lower pump valve device 125 and the pump cylinder 105, the space in turn communicating with a vertical inlet passage 130 formed in the lower plug 124.

The lower end of the lower plug 124 is connected by external threads to a lower inlet fitting 131 provided with a lower conical end 132 in which an inlet opening 133 is formed. The conical end 132 of the inlet fitting 131 is adapted to seat in an inlet seat 134 carried by a bottom hole fitting 135 suitably threaded to the lower end of a production tubing 136 which extends upwardly through the well to the surface of the ground and is adapted to convey pumped fluid therethrough. I prefer to connect to the lower end of the fitting 135 a liner 137 having a lower open end and which may extend as far as desired below the fitting into the well, although it will be understood that this liner may be omitted if desired.

Threaded into the lower end of the lower plug 124 is a tubular closure member 138 having its lower end closed. A lower piston rod 139 is suitably connected to the lower end of the pump piston 122 and extends downwardly through the lower pump valve device 125 and the lower plug 124 into the interior of the tubular closure member 138. As will be noted, the pilot rod 86, the motor piston 87, the intermediate piston rod 121, the pump piston 122, and the lower piston rod 139 are provided with axially aligned and communicating longitudinal passages 141, 142, 143, 144, and 145, respectively, so as to provide fluid communication therethrough with the interior of the tubular closure member 138 so as to balance the fluid pressure on the upper and lower ends of the rods.

As shown in Figs. 1 and 4, the upper end of the pilot rod 86 is provided with a plurality of circumferentially spaced upper vertical channels 146, and also formed therebelow in the external surface of the pilot rod is a set of lower vertical channels 148, as best shown in Figs. 1 and 12, for a purpose to be described hereinafter.

During operation, operating fluid, such as, for example, oil, under relatively high pressure is conveyed downwardly through the fluid supply tubing 27 and the upper fitting 26 to the interior of the valve body 29, from whence it is conveyed through the main valve member 60, as will be described hereinafter, alternately to opposite ends of the motor piston 87, causing the same to reciprocate in the cylinder liner 45. Reciprocation of the motor piston 87 is communicated through the intermediate piston rod 121 to the pump piston 122, causing the same to reciprocate similarly in the cylinder liner 106. In the position shown in Fig. 1, the motor piston 87 is substantially at the upper end of its stroke, and as it moves downwardly to the position shown in Fig. 17, in which it is substantially at the lower end of its stroke, it carries with it the pump piston 122, and well fluid flows upwardly through the liner 137, the inlet opening 133, the lower inlet fitting 131, the vertical inlet passages 130, the space 129, the longitudinal passages 107, and the upper inlet passages 118, through the upper inlet valve 111, and into the upper end of the cylinder liner 106 above the pump piston 122 as the same moves downwardly. During such downward movement of the pump piston 122, fluid in the cylinder liner 106 therebelow is expelled therefrom through the lower discharge valve 126 and the lower discharge passage 128 directly into the production tubing 136, from whence it flows upwardly therethrough to the surface of the ground. During downward movement of the pump piston 122, obviously, the upper discharge valve 110 and the lower inlet valve 127 will both remain closed. When the motor piston 87 starts its upward stroke from the position shown in Fig. 17 to that shown in Fig. 1, it carries with it the pump piston 122, and well fluid from the space 129 will be drawn inwardly through the lower inlet valve 127 into the lower end of the cylinder liner 106 below the pump piston 122, and at the same time fluid in the cylinder liner 106 above the pump piston 122 will be expelled therefrom through the upper discharge valve 110 and the upper discharge passages 113 into the production tubing 136, from whence it flows upwardly to the surface of the ground. Thus, it will be understood that a substantially continuous upward flow of pumped fluid is created in the production tubing 136 during reciprocation of the pump piston 122.

*Operation.—Normal conditions of 100% liquid in pump*

The operation of the main valve member 60 will now be described, but as it operates differently under different well conditions its normal operation under normal well conditions will first be described. By "normal well conditions" I mean the usual situation in which the pump cylinder liner 106 is filled with substantially solid fluid, i. e., when there is little or no free gas mixed with the liquid in the cylinder liner 106. When the pump cylinder liner 106 is entirely filled with liquid, the operation is the same when the valve member 60 is designed to govern at full speed or at full pressure as for half-speed or any other speed. Consequently, the following description will serve to illustrate the operation of the device under normal conditions, regardless of the speed provided for during governing. The pump disclosed herein is designed to operate at half-speed at full pressure of the operating fluid during governing.

With the parts in the position shown in Fig. 1, the main valve member 60 is in its uppermost position, and the motor and pump pistons 87 and 122, respectively, and the pilot rod 86, have reached substantially the upper ends of their upward strokes. The lower inlet ports 67 of the main valve member are aligned with the fluted annular channel 35 and are fully open, and there is an unrestricted flow of operating fluid from the supply tubing through the interior of the valve body 29 and through the lower inlet ports 67, the fluted annular channel 35, the secondary fluid passages 36, the fluid passages 93, the annular chamber 43, the longitudinal passages 102, and the lower motor cylinder ports 100 into the cylinder liner 45 below the motor piston 87, tending to cause the same to move upwardly. The upper end of the motor piston 87 is open to the relatively low fluid pressure in the production tubing 136, the same being called "discharge pressure" hereinafter, through the annular channel 90, the vertical passages 92, the primary fluid passages 34, the circular channel 33, the annular channel 69, and the motor discharge ports 37, and during upward movement of the motor piston spent operating fluid thereabove may thus exhaust into the production tubing.

As the pilot rod 86 has substantially reached the upper end of its upward stroke, as shown in Fig. 1, the lower vertical channels 148 therein span the lower annular channel 55 and the annular channel 52 to open the annular space 48 beneath the main valve member 60 to discharge pressure through the intermediate liner ports 53, the annular channel 52, the lower vertical channels 148, the lower annular channel 55, the lower liner ports 56, the annular space 57, the opening 59, the exhaust passage 39, the annular channel 31, and the discharge ports 37 to the exterior of the valve body. Since the pressure exerted by the operating fluid on the upper end of the minor portion 61 of the valve member 60 is substantially greater than the pressure exerted on the lower end of the major portion 63 of the valve member by the discharge pressure in the production tubing 136, the valve member, as shown in Fig. 1, is about to move downwardly. The valve member 60 then moves downwardly at a relatively high rate of speed to the position shown in Fig. 14, at which time the downward speed thereof is materially reduced, the initial phase of the downward movement of the valve member being graphically represented by the portion 150 of the chart illustrated in Fig. 21.

Figure 14:
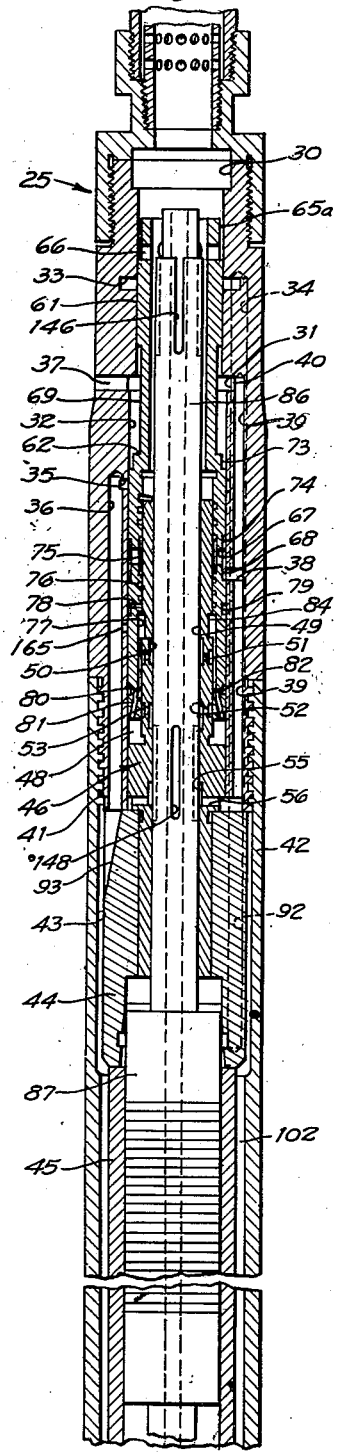
Fig. 14 is a vertical sectional view of my invention, showing the main valve in one position of operation.

As the valve member 60 moves downwardly from the position shown in Fig. 1 to the position shown in Fig. 14, the lower inlet ports 67 therein pass out of registry with the fluted annular channel 35, thus shutting off the flow of operating fluid to the lower end of the power piston 87. Similarly, the annular channel 69 formed on the exterior of the valve member 60 passes out of registry with the circular channel 33, thus shutting off the exhaust flow of spent operating fluid from the upper end of the motor piston 87.

When the valve member 60 reaches the position shown in Fig. 14, the lower end thereof has just closed the intermediate liner ports 53 so as to shut off the open exhaust of fluid therethrough from the lower end of the annular space 48. However, just prior thereto downward movement of the valve member 60 has caused the annular channel 68 to register with the upper valve discharge port 38, so as to maintain the annular space 48 below the valve member in communication with the discharge pressure through the valve passages 81, the circular channel 80, the wide annular channel 77, the helical passage 76, the annular channel 75, the lower inlet ports 67, the annular channel 68, the upper valve discharge port 38, the exhaust passage 39 and the valve discharge ports 37. Since the helical passage 76 is relatively long and is of restricted cross-sectional area, fluid from the space 48 below the valve member 60 exhausts slowly, and, consequently, the valve member 60 moves slowly until it reaches the position shown in Fig. 15, this slow phase of its movement being graphically illustrated by the portion 151 of the chart shown in Fig. 21.

Figure 15:
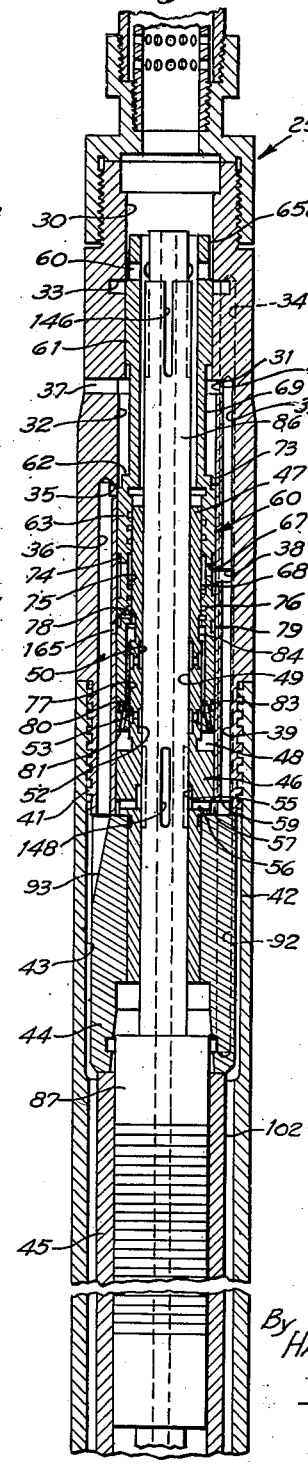
Fig. 15 is a vertical sectional view of my invention, showing the main valve in another position of operation.

During the relatively slow downward movement of the valve member 60 between the positions shown in Figs. 14 and 15, the flow of operating fluid to the upper end of the motor piston 87 is started and increased gradually to prevent fluid shock which would otherwise occur if the full volume of operating fluid were suddenly delivered to the motor piston. This gradual increase in the volume of operating fluid delivered to the upper end of the motor piston 87 is controlled indirectly by the varying-length vertical channels 73, best shown in Fig. 13, which, as downward movement of the valve member 60 progresses, successively open restricted fluid communication between the relatively low discharge pressure in the ports 37 and the circular channel 31, and, consequently, the lower end of the motor piston. The throttling effect of the channels 73 only gradually relieves the fluid pressure on the lower end of the motor piston 87, which retards the movement of the piston. Consequently, the motor piston 87 accelerates gradually in its initial downward movement, as graphically indicated by the portion 160 of the chart of Fig. 21. It will thus be understood that during the first portion of this slow phase of the downward movement of the valve member 60 the discharge from below the motor piston 87 is metered by the vertical channels 73.

As soon as the vertical channels 73 start to register with the lower circular channel 35 and spent operating fluid flows therethrough from the lower end of the motor piston 87 with the downstroke thereof, the pilot rod 86 also moves downwardly to take the lower vertical channels 148 therein out of registry with the annular channel 52, as shown in Fig. 15, thus shutting off all communication between the annular channel 52 and the lower annular channel 55 during the remainder of the downstroke of the valve member 60. However, upon the valve member 60 reaching the position shown in Fig. 15, the circular channel 79 registers with the outer governing port 165, and the lower end of the valve member 60 is thus additionally opened to discharge pressure through the upper governing port 78, the outer governing port 165, the secondary passage 36, the fluted annular channel 35, the vertical varying-length channels 73, the shallow annular channel 69, and the motor discharge ports 37. The cross-sectional area of this fluid path and the length of this path are selected to give a fluid flow capacity which is large relative to that of the path through the helical passage 76, the valve member 60 increases its downward rate of movement until it reaches the position shown in Fig. 16, this phase of downward travel of the valve member being graphically represented by the portion 152 of the chart shown in Fig. 21. As will be noted from Fig. 21, however, the downward speed of the valve member 60 during the portion 152 of its travel is not as great as the speed of its initial travel represented by the portion 150, which is due to the difference in lengths and cross-sectional areas of the passages and ports through which the fluid exhausts from the annular space 48 in the two portions of travel of the valve member, respectively.

It is to be noted that on the downstroke of the valve member 60, although the annular channel 65a initially registers with the circular channel 33 simultaneously with the initial registry of the vertical channels 73 with the fluted annular channel 35 so as to throttle the initial discharge of spent operating fluid from below the motor piston 87, the annular channel 65a on the upper end of the valve member 60 fully opens to the circular channel 33 before the annular channel 69 fully opens to the fluted annular channel 35.

As soon as the annular channel 65a registers with the circular channel 33, a substantially uninterrupted flow of operating fluid can flow to the upper end of the motor piston 87, and thus the vertical channels 73 continue to throttle the flow of spent operating fluid from beneath the motor piston after a free flow of operating fluid is permitted to flow to the upper end of the motor piston. This continued throttling of the spent operating fluid through the vertical channels 73 only continues, of course, until the valve member 60 has moved downwardly sufficiently to permit the annular chanel 69 to register directly with the fluted annular channel 35, at which time, as shown in Fig. 16, the circular channel 33 is fully open to operating fluid through the annular channel 65a and the upper inlet ports 66, and the fluted annular channel 35 is fully open to discharge pressure through the annular channel 69 and the motor discharge ports 37.

Figure 16:
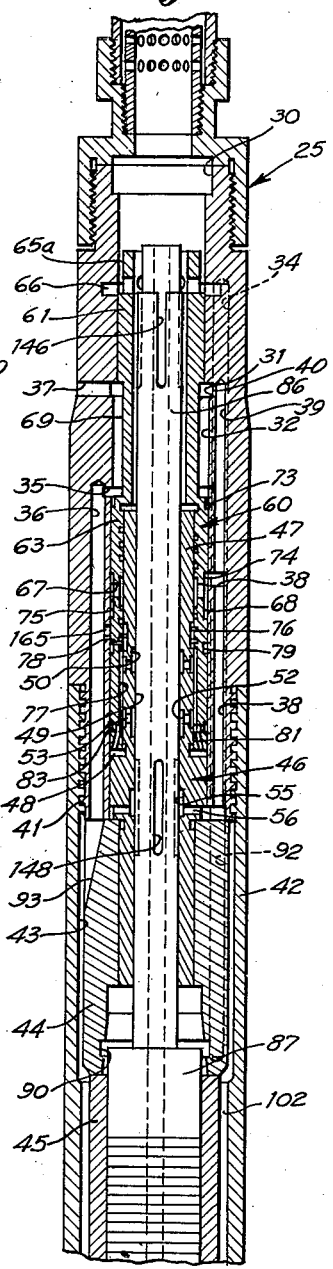
Fig. 16 is a vertical sectional view of my invention, showing the main valve in another position of operation.

When the valve member 60 reaches the position shown in Fig. 16, it will be noted that the circular channel 79 has passed downwardly out of registry with the outer governing port 165, and, consequently, fluid from the annular space 48 must again exhaust through the helical passage 76 and the upper valve discharge port 38, which, due to the relatively small fluid flow capacity of this path of flow, produces a small amount of end movement of the valve member at the same rate as represented by the portion 151 of the chart of Fig. 21. This slow end action of the valve member is designed to protect it against undesirable hammering, and for the purpose of simplification has been omitted from the charts of Figs. 21 to 23, although it will be understood that it will be present under all conditions of operation where the valve member completes its stroke. So far as a general understanding of the action of the valve member 60 is concerned, however, the valve member may be regarded as remaining substantially in the position shown in Fig. 16 until it starts its upstroke, this stationary phase of the valve member's action being shown by the portion 153 of the chart of Fig. 21. As will be noted, when the valve member 60 reaches the position shown in Fig. 16, operating fluid unrestrictedly flows to the upper end of the motor piston 87 from the upper fitting 26 through the annular channel 65a and the upper inlet ports 66, through the circular channel 33, the primary fluid passages 34, the passages 92, and through the annular chanel 90 into the upper end of the cylinder liner 45. In this position, also, the lower end of the motor piston 87 is unrestrictedly opened to exhaust pressure through the lower motor cylinder ports 100, the longitudinal passages 102, the annular chamber 43, the fluid passages 93, the secondary fluid passages 36, the fluted annular channel 35, the annular channel 69, and the motor discharge ports 37. The motor piston 87 then completes its downward stroke, graphically represented by the portion 154 of the chart of Fig. 21, reaching the position shown in Fig. 17.

When the motor piston 87 and pilot rod 86 approach their lower position, shown in Fig. 17, the upper longitudinal channels 146 in the pilot rod register with the annular channel 50 in the upper sleeve portion 47 of the valve liner 46, so as to open fluid communication between the operating fluid in the supply pipe 27 and the lower end of the space 48 through the annular channel 50, the upper liner ports 51, the wide annular channel 77, the circular channel 80, and the valve passages 81. Since the cross-sectional area of the lower end of the valve member 60 is greater than that of its upper end, and since the valve member 60 is so designed that when in this position the total upward force exerted by the operating fluid thereon exceeds the total downward force exerted thereon by the operating fluid and the discharge pressure, the admission of operating fluid beneath the valve member 60 causes the same to move upwardly at a relatively high rate of speed to the position shown in Fig. 18, this first phase of the upward movement of the valve member being graphically illustrated by the portion 155 of the chart shown in Fig. 21. It will be understood that the area ratio between the pressure ends of the valve member 60 which includes the areas open to exhaust can be altered to vary the action of the valve member as desired.

In the form illustrated, the upper portion of the valve member 60 is divided into two equal pressure cross-sectional areas by the sliding fit of the minor portion 61 thereof in the minor bore 30, i. e., the upper end of the valve member 60, a cross section of which defines one of such areas, and the top of the major portion 63 of the valve member, a cross section of which defines the other of such areas. This is accomplished by selecting the diameter of the minor portion 61 so that its cross-sectional area, less the cross-sectional area of the valve sleeve 47, is equal to the cross-sectional area of the major bore 32 less the cross-sectional area of the minor bore 30. Also, in this case, the cross-sectional area of the major bore 32, less the cross-sectional area of the valve sleeve 47, is equal to the sum of the two net areas set forth above.

Upon its arrival at the position shown in Fig. 18, the lower end of the valve member 60 has just closed the upper liner ports 51, but considerably previous thereto the annular channel 75 has opened fluid communication between the operating fluid and the annular space 48 through the helical passage 76, the wide annular channel 77, the circular channel 80, and the valve passages 81. Thus, closure of the upper liner ports 51 does not stop the upward movement of the valve member 60, but due to the restricted cross-sectional area and length of the helical passage 76, the flow of operating fluid to the under side of the valve member is retarded, and, consequently, the valve member moves relatively slowly to the position shown in Fig. 19, this second phase of the upward movement of the valve member being graphically illustrated by the portion 156 of the chart of Fig. 21. It is to be noted that when the valve member 60 travels upward before the lower inlet port 67 is out of communication with the upper valve discharge port 38, the upper end of the helical groove 76a is open to high pressure operating fluid above the valve liner 46. This is an important feature, as occasionally the pilot rod 86 may move upwardly slightly so as to move the upper longitudinal channels 146 therein out of registry with the annular channel 50, which stops the flow of operating fluid to the lower end of the annular space 48 through the upper liner ports 51, but in this case the helical groove 76a is open to high pressure before the ports 67 are cut off from the port 38, and therefore the valve member 60 cannot stop on dead center. This is accomplished by having the pressure open through the helical groove 76a, and exhaust open through the ports 67 and 38 for that part of the motion of the valve 60 where dead center would otherwise be possible. If the pilot rod 86 moves upwardly slightly so as to move the upper longitudinal channels 146 out of registry with the annular channel 50 while the lower inlet ports 67 are still in fluid communication with the upper valve discharge 38 through the annular channel 68, since fluid communication still exists between the lower end of the space 48 and the discharge pressure through the helical passage 76, the fluid from below the valve member will slowly exhaust therethrough, permitting the valve member to move downwardly to the lower end of its stroke, following which it will again start its upstroke, and since by the time the valve member reaches the lower end of its stroke operating fluid will again have moved the motor piston to the lower end of its stroke, a normal upstroke of the valve member can be performed. Similarly, if the pilot rod moves upwardly slightly so as to move the upper longitudinal channels 146 out of registry with the annular channel 50 after the upper end of the annular channel 75 has moved above the upper end of the valve liner 46, operating fluid is then in direct communication with the lower end of the valve member through the helical passages 76 or 76a, and it can complete its upstroke at the rate indicated by the portion 157 of the chart of Fig. 21. The same feature to eliminate the tendency of the valve member 60 to stop on dead center is provided in the downstroke of the valve member 60 when the lower inlet ports 67 move downwardly out of communication above the valve liner 46 with the operating fluid and before the annular channel 68 registers with the upper valve discharge port 38. The helical groove 76a is open to pressure and hence eliminates any tendency of the valve member to stop on dead center.

During the relatively slow upward movement of the valve member 60 between the positions shown in Figs. 18 and 19, the flow of operating fluid to the lower end of the motor piston 87 is started and increased gradually to prevent fluid shock which would otherwise occur if the full volume of operating fluid were suddenly delivered to the motor piston. This gradual increase in the volume of operating fluid delivered to the lower end of the motor piston 87 is controlled by the varying-length vertical channels 74, best shown in Fig. 13, which progressively register with the fluted annular channel 35, to meter the flow therethrough. Consequently, the motor piston 87 accelerates gradually in its initial upward movement, as graphically represented by the portion 161 of the chart shown in Fig. 21. Simultaneously with the initial registry of the vertical channels 74 with the fluted annular channel 35, the annular channel 69 of the valve 60 starts to uncover the annular passage 33 in the valve body, which communicates through the channel 69 and discharge ports 37 to exhaust pressure and opens the upper end of the motor piston 87 to discharge pressure simultaneously with the initial admission of operating fluid to the lower end of the motor piston. The vertical channels 74 are of such length that on the upstroke of the valve member 60 the annular channel 69 fully registers with the circular channel 33 to permit uninterrupted discharge from the upper end of the motor piston 87 while the vertical channels 74 are throttling the flow of operating fluid therethrough to the fluted annular channel 35 and to the lower end of the motor piston.

When the valve member 60 reaches the position shown in Fig. 19, the circular channel 83 and the lower governing port 82 register with the outer governing port 165, and the lower end of the valve member 60 is thus additionally opened to operating fluid through the lower inlet ports 67, the fluted annular channel 35, the secondary passage 36, the outer governing port 165, the lower governing port 82, and the valve passage 81, and thereupon the valve member continues its upward movement at an increased rate of speed until it reaches the position shown in Fig. 20. This phase of upward movement of the valve member 60 is graphically illustrated by the portion 157 of the chart shown in Fig. 21.

When the valve member 60 reaches the position shown in Fig. 20, the upper end of the motor piston 87 is unrestrictedly opened to discharge pressure from the primary fluid passages 34, the circular channel 33, the annular channel 69, the circular channel 31, and the motor discharge ports 37. Also, the lower end of the motor piston 87 is unrestrictedly opened to operating fluid through the lower motor cylinder ports 100, the longitudinal passages 102, the annular chamber 43, the fluid passages 93, the secondary fluid passages 36, the fluted annular channel 35, and the lower inlet ports 67. Consequently, from the position shown in Fig. 20 the motor piston 87 moves upwardly to the position shown in Fig. 1, as illustrated by the portion 159 of the graph of Fig. 21. When the valve member 60 has moved upwardly to the position shown in Fig. 20, it will be noted that the upper end of the valve member has not yet engaged the fitting 26 and that the annular channel 83 has just moved out of registry with the outer governing port 165. Consequently, in this position operating fluid can still flow to the lower end of the valve member 60 through the helical passage 76, which causes a slight further end movement of the valve member at a reduced rate of speed, which is the same as that indicated by the portion 156 of Fig. 21, and which provides a small amount of upward end movement of the valve member similar to the lower and movement thereof described hereinabove. So far as a general understanding of the operation of the valve member 60 is concerned, the valve member may be regarded as remaining substantially stationary in the position shown in Fig. 20, as graphically indicated by the portion 158 of the chart of Fig. 21, the remaining upward movement of the motor piston being represented by the portion 159 of the chart. When the parts reach the positions shown in Fig. 1, a complete cycle of operation has been completed, and a new cycle starts, as described hereinabove.

From the foregoing description, it may be noted that if any sand is carried upwardly with the well production through the production tubing 136 it cannot readily enter the valve element 25 so as to damage the valve 60, as it must pass through the discharge ports 37, the annular channel 31, the vertical passage 39, and the port 38. Such passages provide a tortuous path deterring the entrance of such sand, and this is a feature of the invention, as the presence of sand may obviously be detrimental to the operation of the valve 60.

In the operation of a fluid-operated pump, such as described herein, it is desirable to maintain the flow of operating fluid to the motor piston at a substantially uniform rate. If, however, the pump load is suddenly decreased, the rate of flow of operating fluid normally would increase, as pointed out hereinabove, with attendant excessive increase in the speed of the motor and pump. To prevent this condition occurring, my invention includes governing means adapted to operate in response to a decrease in pump load to maintain the flow of operating fluid to the motor piston 87 below a predetermined maximum rate, so as to prevent undesired acceleration of the moving parts, and the operation of such governing means is now described.

The governing means of my invention includes the upper and lower governing ports 78 and 82, respectively, and the outer governing port 165 communicating between one of the secondary fluid passages 36 and the annular space 48, as shown in Fig. 10.

*Operation with 15% liquid*

When the pump cylinder liner 103 ahead of the pump piston 122 contains only about 15% well liquid and the balance gas, the governing action of my device is as follows: The valve member 60 moves downwardly from the position shown in Fig. 1 to the position shown in Fig. 14 at a rapid rate, this portion of its movement being illustrated graphically by the portion 162 of the chart of Fig. 22, which action is exactly the same as the action thereof shown by the portion 150 of Fig. 21. The valve member 60 then continues its downward movement at a slow rate, this portion of its travel being illustrated by the portion 163 of the chart of Fig. 22, which action is exactly the same as the action thereof shown by the portion 151 of Fig. 21. At the beginning of the slow downward movement of the valve member 60, in which it is in the position shown in Fig. 15, the channel 65a begins to register with the circular channel 33 to permit an initial flow of operating fluid from the supply pipe 27 to the upper end of the motor piston 87, and simultaneously during this portion of the movement of the valve member 60 the vertical channels 73 successively register with the fluted annular channel 35 to permit a restricted flow of spent operating fluid to exhaust from below the motor piston 87. After the vertical channels 73 begin to register with the fluted annular channel 35, at which time the annular channel 65a is fully open to the circular channel 33, the circular channel 79 registers with the outer governing port 165. Since the pump cylinder liner 103 below the pump piston 122 is filled largely with compressible gas, the force needed to move the pump piston downwardly to compress this gas is relatively small compared with the force required to move the pump piston when it is engaging solid liquid, and, consequently, even a restricted passage for operating fluid to the upper end of the motor piston 87 is sufficient to start the downward movement of the motor and pump pistons at a greater rate of speed than would be the case if the pump piston were engaging solid liquid. Due to the fact that the discharge from below the pump piston is throttled by the restricted cross-sectional areas of some of the vertical channels 73 communicating with the fluted annular channel 35, fluid pressure quickly builds up in the secondary passages 36, and this rise in fluid pressure is communicated to the lower end of the valve member 60 through the outer governing port 165 and the upper governing port 78, which prevents further downward movement of the valve member until the fluid pressure therebelow is reduced, as the valve member is so designed that a predetermined rise in pressure therebelow will stop its continued downward movement, due to the difference in areas of its upper and lower ends, and due to the fact that fluid under such increased pressure is supplied from the secondary passage 36 through the outer governing port to the bottom of the annular space 48 faster than it can exhaust through the helical passage 76. This portion of the valve cycle, during which it hangs up and meters the flow, may be referred to as the governing portion of its cycle, and is represented by the portion 163a of the chart of Fig. 22. It is also to be noted that the proper relation must be maintained in design between the cross-sectional area of the outer governing port 165, the helical passage 76, the annular channel 79, the port 78, the wide annular channel 77, the annular channel 80, and the passages 81, as the outer governing port 175 must admit fluid to the lower end of the valve member 60 faster than the helical passage 76 will permit it to exhaust through the upper valve discharge port 38.

The motor piston 87 will move at the predetermined governed velocity (in this case, one-half of the full rated speed of the pump), as indicated by the portion 167 of Fig. 22, until the pump piston strikes solid liquid, which point is indicated at 167a of Fig. 22. When this occurs, the downward rate of movement of the pump piston 122, and the motor piston connected thereto, is reduced, and consequently the fluid discharge pressure in the secondary passages 36 drops due to the reduction in speed of the pistons, thus allowing the fluid beneath the valve member 60 in the annular space 48 to exhaust into the secondary passages 36 through the outer governing port 165 to permit the valve member to resume its downward movement from the position shown in Fig. 15 to that shown in Fig. 16, which movement is represented by the portion 168 of the chart of Fig. 22, and which is exactly the same as the corresponding valve movement under normal conditions as represented by the portion 152 of the chart of Fig. 21. During the first part of this movement of the valve member 60 from the position shown in Fig. 15 to that shown in Fig. 16, the vertical channels 73 gradually shorten to zero length, at which time the annular shoulder 62 of the valve member 60 registers with the fluted annular chamber 35. During the remainder of the movement of the valve member 60, the passage area opens rapidly as the shoulder 62 moves to the lower side of the fluted annular channel 35, at which time the annular channel 69 registers with the channel 35 to fully open the discharge from the lower end of the pump piston 122. Prior to the governing or metering action through the vertical channels 73, the annular channel 65a has registered with the circular channel 33 to open the upper end of the power piston 87 to operating fluid, as described hereinabove in connection with the operations shown in Fig. 21. As soon as the pump piston 122 hits solid liquid in the pump and the valve member 60 has reached the position shown in Fig. 16, the balance of the stroke of the motor piston 87 is at normal velocity, as indicated by the portion 169 of the chart of Fig. 22, the change in speed of the piston from one-half normal velocity during the governing portion of the valve cycle to further reduced velocity at the beginning of the transition from and back to normal velocity when the valve reaches the full open position being gradual as the valve member is in the throttling or controlling position shown in Fig. 15 when the pump piston strikes solid liquid and the valve has to open before the piston can assume normal speed under load, which, plus the compression of the gas below the pump piston, tends to round off the curve shown in Fig. 22 and make a gradual transition in piston speed, as illustrated by the portion 169a thereof. As soon as the valve member 60 reaches the position shown in Fig. 16, it remains substantially stationary until the motor piston 87 completes its downward stroke, this portion of the action of the valve member being represented by the portion 171 of the chart of Fig. 22.

The same type of governing action takes place upon the upward movement of the valve member 60, as is shown by Fig. 22, but is accomplished in a slightly different manner. When the pump cylinder liner 106 above the pump piston 122 is similarly filled with a mixture of gas and fluid, the upward movement of the valve member 60 is the same as the upward movement thereof under normal conditions of operation as shown in Fig. 21 until the valve member 60 reaches the position shown in Fig. 19. When the valve member 60 reaches the position shown in Fig. 19, the upper end of the motor piston 87 is fully open to exhaust pressure by registry of the annular channel 69 with the circular channel 33, and discharge ports 37, but operating fluid is still metered through the vertical channels 74 which have just started to register with the fluted annular channel 35, thus throttling the flow of operating fluid to the lower end of the motor piston 87, as described hereinabove, and the circular channel 83 of the lower governing port 82 has just registered with the outer governing port 165. As will also be noted from Fig. 19, the motor piston 87 has started its upward movement, and the vertical channels 146 are out of registry with the annular channel 50. Due to gas in the pump cylinder above the pump piston 122, the fluid pressure of the operating fluid in the secondary passages 36 remains relatively low as the flow is throttled through the vertical channels 74 until the pump piston strikes solid liquid, and while the pressure in the secondary passages is thus relatively low, operating fluid which would be normally supplied to the lower end of the valve member 60 through the helical passage 76 is permitted to discharge from the wide annular channel 77 through the lower governing port 82, the circular channel 83, and the outer governing port 165 into the secondary passages 36, thus keeping the full pressure of the operating fluid off the lower end of the valve member 60, which causes it to remain stationary in a second governing position, as illustrated by the portion 172 of the chart Fig. 22. As the valve member 60 thus hangs up until the pump piston 122 again strikes solid liquid, the flow of operating fluid to the lower end of the motor piston 87 is metered through the vertical channels 74 while the valve member remains stationary. As soon as the pump piston strikes solid liquid, the fluid pressure in the secondary passages 36 rises due to a decrease in the throttling action of the vertical channels 74 because of the resulting lower pump piston speed, and, consequently, the discharge of operating fluid from the lower governing port 82 stops, and operating fluid then flows to the lower end of the valve member 60 from the secondary passages 36, causing the valve member 60 to resume its upward movement represented by the portion 173 of the chart shown in Fig. 22. The upstroke of the motor piston 87 is the same as the downstroke, as shown in Fig. 22, when the proportion of gas and liquid on both ends of the pump piston 122 is the same.

Since the speed of the motor piston 87 is reduced during governing to one-half that illustrated in Fig. 21, and since the piston moves 85% of its stroke at half-speed, it takes 1.7 times as long to hit solid fluid as it does to complete the full stroke illustrated in Fig. 21. The total time for the stroke of the motor piston 87 depends on how constant the maximum pressure is held. If it is constant, then the remaining 15% of the stroke of the motor piston 87 will take .15 of the normal time. Therefore, the total time for the cycle will be 1.85 times that of the normal cycle shown in Fig. 21. Of course, if the pump is operating at full pump speed and is on a source of operating fluid of constant displacement when governing takes place, then the surplus operating fluid during governing must be disposed of through a suitable relief valve or the volume displacement of the source would have to be reduced an amount corresponding to the reduction in speed of the fluid-operated pump.

*Operation with zero liquid*

Fig. 23 graphically illustrates the operation of the motor piston 87 and the valve member 60 in the special case when the pump is operating at zero efficiency, i. e., when the pump is not pumping any fluid from the well. This condition of zero efficiency may be caused by the upper and lower inlet valves 111 and 127, respectively, becoming clogged with foreign material so that they will not unseat, or may be caused by other operating conditions. Under these conditions of operation, the valve member 60 performs its first two functions, illustrated by the portions 180 and 181 of the chart of Fig. 23, normally, as will be seen by a comparison with the chart of Fig. 21, but hangs up and remains in the governing position shown in Fig. 15 and graphically indicated by the portion 182 of Fig. 23 for the remainder of the downstroke of the motor piston 87, indicated by the portion 182a of Fig. 23. The valve member 60 hangs up due to the normal pressure drop in the passages due to fluid friction therein, which pressure drop is sufficient to cause the valve member to hang up so long as no fluid is being pumped by the pump piston 122. If the condition of zero efficiency is caused by the pump cylinder being filled with gas only and the pressure on this gas is such that compression to the full discharge or column pressure occurs before the piston reaches the end of the stroke, gas will be discharged by the pump piston 122, and in this case the valve action will resemble the action thereof illustrated in Fig. 22. The point where the gas is compressed to full column pressure will correspond to the point where the piston strikes solid fluid. At the end of the downstroke of the motor piston 87, the valve member 60 then resumes substantially normal operation for its first two functions on its upstroke, as graphically indicated by the portions 183 and 184 of Fig. 23, on the start of the upstroke of the motor piston, but hangs up in the governing position shown in Fig. 19 and graphically shown by the portion 185 of Fig. 23 for the balance of the upstroke of the motor piston. It will therefore be appreciated that under such conditions of operation the speed of the piston motion is substantially reduced and the energy of the operating fluid, which would normally be used to operate the fluid operated pump to lift well liquid, is all consumed in the throttling action of the valve member 60.

It will be appreciated that the conditions of operation graphically illustrated by Figs. 21, 22, and 23 are not mutually exclusive or typical, but are merely examples of the operation of my invention under selected different operating conditions selected for illustration. The movement of the valve member 60 under other operating conditions may vary substantially, but in every case will be such as to meter the flow to the motor piston 87 on the upstroke of the valve member and to meter the flow from the motor piston on the downstroke of the valve member, to prevent racing of the pistons. Those skilled in the art will readily understand that the flow governing action of my valve construction occurs whenever the pump piston 122 strikes gas instead of solid liquid, and that the upward or downward movement of the valve member 60 stops until the pump piston strikes solid liquid, thus providing an automatic throttling action to maintain the flow of operating fluid to the motor piston 87 below a predetermined maximum rate, thus preventing racing of the pump with the attendant danger of damage to the moving parts. It will thus be apparent that the number of strokes per minute of my pump will be maintained below a predetermined maximum, regardless of the presence of gas in the pump liner 106 and regardless of the amount of such gas, in spite of the normal tendency of the pistons to speed up under such circumstances.

The rate of speed of the motor piston 87 during the governing portion of the cycle of the valve 60 may be changed readily by changing the width of the circular channels 79 and 83. If it is desired to cause the motor piston 87 to travel at a slower speed during governing of the valve 60, the channels 79 and 83 are merely widened so that they open earlier and hence at a point where the available cross-sectional area of the vertical channels 73 and 74 is smaller. If it is desired to cause the motor piston 87 to travel at a higher speed during governing, the circular channels 79 and 83 are merely made narrower, so that they open later at a point where the available cross-sectional area of the vertical channels 73 and 74 is greater. The speed of the motor piston 87 during the governing portion of the cycle of the valve 60 is a direct function of the available cross-sectional area of the vertical channels 73 and 74 at the start of the governing portion of the cycle, and a square root function of the applied pressure. It will thus be understood that the present valve construction has considerable versatility and can be made to control the operation of the motor piston 87 under a variety of pumping conditions as desired.

It will also be understood that, although in Figs. 21, 22 and 23 I have shown the action of the pump as being the same on the upstroke as on the downstroke of the pistons thereof, the governing actions on the upstroke and downstroke are entirely independent. Thus, the pump cylinder may, in actual operation, fill at one end with solid liquid and with a gas-liquid mixture in any proportions at the other end, in which case the valve 60 would govern only when the pump piston is compressing the gas in the gas-liquid mixture. As an example, if the pump cylinder below the pump piston is filled with solid liquid the downstroke will be as shown in the left-hand half of Fig. 21, and if during such downstroke the pump cylinder above the pump piston fills with a mixture of 15% liquid and 85% gas the upstroke will be as shown in the right-hand half of Fig. 22. Similarly, if only one intake or discharge passage were obstructed the valve 60 would govern on the stroke affected but its operation would be normal on the other stroke. Also, if the pump cylinder fills with gas-liquid mixtures at both ends, but in different proportions, the valve 60 would govern on both strokes but during different portions of each, but in all cases controlled by the working load on the pump piston.

Although I have shown and described a preferred embodiment of the invention, it is to be understood that I do not intend to be limited thereto, but desire to be afforded the full scope of the following claims.

I claim as my invention:

1. In a device of the character described, the combination of: a cylinder having a piston therein; a pair of sources of fluid respectively providing high and low pressures; a pair of passages connecting said sources to the respective ends of said cylinder for applying said high and low pressures to the respective ends of said piston to move said piston in said cylinder, said piston moving at a normal speed in response to predetermined rates of flow of fluid through the respective passages; hydraulically actuable valve means controlling one of said passages and movable from a closed position through a partially open, throttling position to a fully open position, said valve means, when in said throttling position, metering fluid through said one passage at a restricted rate of flow substantially less than said predetermined rate of flow therethrough so as to restrict said piston to a speed substantially less than said normal speed, said valve means being retainable in said throttling position by balancing the pressure forces applied thereto; and control means for balancing the pressure forces applied to said valve means.

2. In a device of the character described, the combination of: a cylinder having a piston therein; a pair of sources of fluid respectively providing high and low pressures; a pair of passages connecting said sources to the respective ends of said cylinder for applying said high and low pressures to the respective ends of said piston to move said piston in said cylinder, said piston moving at a normal speed in response to predetermined rates of flow of fluid through the respective passages; hydraulically actuable valve means controlling one of said passages and movable from a closed position through a partially open, throttling position to a fully open position, said valve means, when in said throttling position, metering fluid through said one passage at a restricted rate of flow substantially less than said predetermined rate of flow therethrough so as to restrict said piston to a speed substantially less than said normal speed, said valve means being retainable in said throttling position by balancing the pressure forces applied thereto; and control means for balancing the pressure forces applied to said valve means, said control means including port means for applying to an area of said valve means a pressure preventing movement of said valve means beyond said throttling position toward said open position, said port means including a first port communicating with said one passage and a second port communicating with said area of said valve means, said ports communicating with each other when said valve means is in said throttling position.

3. In a device of the character described, the combination of: a cylinder having a piston therein; a pair of sources of fluid respectively providing high and low pressures; a pair of passages connecting said sources to the respective ends of said cylinder for applying said high and low pressures to the respective ends of said piston to move said piston in said cylinder, said piston moving at a normal speed in response to predetermined rates of flow of fluid through the respective passages; hydraulically actuable valve means controlling one of said passages and movable from a closed position through a partially open, throttling position to a fully open position, said valve means, when in said throttling position, metering fluid through said one passage at a restricted rate of flow substantially less than said predetermined rate of flow therethrough so as to restrict said piston to a speed substantially less than said normal speed, said valve means being retainable in said throttling position by balancing the pressure forces applied thereto; and control means operating in response to a reduction in a load on said piston for balancing the pressure forces applied to said valve means, said control means including port means for applying to an area of said valve means a pressure preventing movement of said valve means beyond said throttling position toward said open position, said port means including a first port communicating with said one passage and a second port communicating with said area of said valve means, said ports communicating with each other when said valve means is in said throttling position.

4. A device as defined in claim 3 wherein said one passage communicates with said source of fluid under low pressure.

5. A device as defined in claim 3 wherein said one passage communicates with said source of fluid under high pressure.

6. In a device of the character described, the combination of: a cylinder having a piston therein; a pair of sources of fluid respectively providing high and low pressures; a pair of passages connecting said sources to the respective ends of said cylinder for applying said high and low pressures to the respective ends of said piston to move said piston in said cylinder, said piston moving at a normal speed in response to predetermined rates of flow of fluid through the respective passages; and valve means controlling one of said passages and movable from a closed position through a partially open, throttling position to a fully open position, said valve means, when in said throttling position, metering fluid through said one passage at a restricted rate of flow substantially less than said predetermined rate of flow therethrough so as to restrict said piston to a speed substantially less than said normal speed.

7. In a valve device, the combination of: a valve housing having an inlet adapted to be connected to a source of operating fluid under relatively high pressure; a valve member in said housing and of the differential area type having a small end adapted to be subjected to said inlet pressure and a large end adapted to be alternately subjected to said inlet pressure to move said valve member from a primary to a secondary position; and fluid passage means continuously communicating with said inlet and an area of said valve member for preventing said valve member from stopping on dead center during movement between said positions.

8. In a valve device, the combination of: a valve housing having an inlet adapted to be connected to a source of operating fluid under relatively high pressure; a valve member in said housing and of the differential area type having a small end adapted to be subjected to said inlet pressure and a large end adapted to be alternately subjected to said inlet pressure to move said valve member from a primary to a secondary position; first port means adapted to convey operating fluid to said large end to move said valve member a first increment of its total movement between said positions; second port means adapted to convey operating fluid to said large end to move said valve member a second increment of its total movement between said positions; and fluid passage means continuously and restrictedly communicating with said inlet and said large end of said valve member for preventing said valve member from stopping on dead center during movement between said positions.

9. In a valve device, the combination of: a valve housing having an inlet adapted to be connected to a source of operating fluid under relatively high pressure; a valve member in said housing and of the differential area type having a small end adapted to be subjected to said inlet pressure and a large end adapted to be alternately subjected to said inlet pressure to move said valve member from a primary to a secondary position; first port means adapted to communicate between said large end and a point of low pressure discharge so as to permit said high pressure operating fluid to move said valve member through a first increment of its movement between said positions; second port means adapted to communicate between said large end and a point of low pressure discharge so as to permit said high pressure operating fluid to move said valve member through a second increment of its movement between said positions; and fluid passage means continuously and restrictedly communicating with said inlet and said large end of said valve member for preventing said valve member from stopping on dead center during movement between said positions.

10. In a valve device for use in a fluid operated pump in a well producing sand in the pumped oil, the combination of: a valve housing; a movable valve member in said housing and of the differential area type having a small end adapted to be subjected to relatively high inlet pressure and a large end adapted to be alternately subjected to said inlet pressure to move said valve member between two operating positions; and passage means adapted to alternately connect said large end to a low pressure discharge port, said passage means being relatively long and tortuous in character so as to inhibit the entrance of sand therethrough into engagement with the central section of said valve member.

11. In a fluid operated motor device, the combination of: a motor cylinder having a motor piston therein; a fluid discharge passage communicating with one end of said motor cylinder, including a discharge passage wall; a source of operating fluid under relatively high pressure; means for supplying said operating fluid to the other end of said cylinder to move said piston therein at a normal rate at a normal working load thereon; a differential-area type valve member having one end larger than the other, said valve member being movable between primary and secondary points and through a throttling position to connect said discharge passage with a relatively low pressure discharge port, and including a valve wall, the large end of said valve member being alternatively exposed to the pressure of said operating fluid; throttling means provided in one of said walls and providing restricted fluid communication between said passage and said discharge port when said valve member is in said throttling position, the cross-sectional area of said throttling means when said valve member is in said throttling position being sufficiently small that fluid cannot exhaust from said one end of said piston at a rate high enough to permit said piston to move at a rate greater than said normal rate; a governing port communicating with said passage; and passage means adapted to provide fluid communication between said governing port and said large end of said valve member when said valve member is in said throttling position so as to admit fluid pressure from said passage to said large end of said valve member so as to maintain said valve member in said throttling position.

12. In a fluid operated motor device, the combination of: a motor cylinder having a motor piston therein; a fluid discharge passage communicating with one end of said motor cylinder, including a discharge passage wall; a source of operating fluid under relatively high pressure; means for supplying said operating fluid to the other end of said cylinder to move said piston therein at a normal rate at a normal working load thereon; a differential-area type valve member having one end larger than the other, said valve member being movable between primary and secondary points and through a throttling position to connect said discharge passage with a relatively low pressure discharge port and including a valve wall, the large end of said valve member being alternatively exposed to the pressure of said operating fluid; throttling means provided in one of said walls and providing restricted fluid communication between said passage and said discharge port when said valve member is in said throttling position, the cross-sectional area of said throttling means when said valve member is in said throttling position being sufficiently small that any tendency of said piston to move at a rate higher than said normal rate will substantially raise the fluid pressure in said passage; a governing port communicating with said passage; and passage means adapted to provide fluid communication between said governing port and said large end of said valve member when said valve member is in said throttling position so as to admit fluid pressure from said passage to said large end of said valve member so as to maintain said valve member in said throttling position so long as the fluid pressure in said passage remains above a predetermined value.

13. In a valve device for use in a fluid operated pump in a well producing sand in the pumped oil, the combination of: a valve housing having a discharge port adjacent the upper end thereof and a passage in the wall of said housing and extending a substantial distance from said discharge port and communicating therewith; and a tubular valve member in said housing, having a valve port communicating with the interior of said valve member, said valve member being movable in said housing to a position in which said valve port communicates with said passage at a point spaced a substantial distance from said discharge port, thereby inhibiting the entrance of sand into engagement with said valve member in the vicinity of said valve port.

14. In a valve device for use in a fluid operated pump in a well producing sand in the pumped oil, the combination of: a valve housing having a discharge port adjacent the upper end thereof and a passage in the wall of said housing and extending a substantial distance from said discharge port and communicating therewith; and a tubular valve member in said housing, having a valve port communicating with the interior of said valve member and passage means in said interior communicating between said valve port and one end of said valve member, said valve member being movable in said housing to a position in which said valve port communicates with said passage at a point spaced a substantial distance from said discharge port, thereby inhibiting the entrance of sand into engagement with said valve member in the vicinity of said valve port.

15. In a valve device for a fluid operated well pump, the combination of: a valve housing; a tubular valve member disposed in said housing and movable relative thereto, said valve member being of the differential-area type having one end of relatively small cross-sectional area and another end of relatively large cross-sectional area; first valve means normally providing fluid communication with said large end during a first portion of the movement of said valve member, said first portion of said movement including movement through a dead center position; second valve means for providing fluid communication with said large end during a second part of the movement of said valve member, said second part of said movement completing the travel of said valve member; and restricted passage means providing fluid communication with said large end during said movement through said dead center position and until said second valve means is fully open so that if said first valve means closes during said first portion of said movement when said valve member is in said dead center position, said valve member will move to one end of its travel.

16. In a valve device for a fluid operated well pump, the combination of: a valve housing having a source of operating fluid under relatively high pressure and having a low pressure discharge port; a valve member in said housing and movable relative thereto, said valve member being of the differential-area type having one end of relatively small cross-sectional area at all times communicating with said source, and having another end of relatively large cross-sectional area adapted to be alternately hydraulically connected to said source and said discharge port; first discharge valve means normally providing fluid communication between said large end of said valve member and said discharge port during a first portion of the movement of said valve member, said first portion of said movement including movement through a dead center position; second discharge valve means for providing fluid communication between said large end of said valve member and said discharge port during a succeeding portion of the movement of said valve member, said succeeding portion of said movement completing the travel of said valve member; and restricted passage means providing fluid communication between said large end and said source when said valve member is in said dead center position and until said second discharge valve means is fully open so that if said first discharge valve means closes when said valve member is in said dead center position, the flow of fluid from said source through said restricted passage means causes said valve member to reverse its direction of movement and complete its movement in such reversed direction.

17. In a valve device for a fluid operated well pump, the combination of: a valve housing having a source of operating fluid under relatively high pressure and having a low pressure discharge port; a valve member in said housing and movable relative thereto, said valve member being of the differential-area type having one end of relatively small cross-sectional area at all times communicating with said source, and having another end of relatively large cross-sectional area adapted to be alternately hydraulically connected to said source and said discharge port; first inlet valve means normally providing fluid communication between said large end of said valve member and said source during a first portion of the movement of said valve member, said first portion of said movement including movement through a dead center position; second inlet valve means for providing fluid communication between said large end of said valve member and said source during a succeeding portion of said movement, said succeeding portion of said movement completing the travel of said valve member; and restricted passage means providing fluid communication between said large end and said source when said valve member is in said dead center position and until said second inlet valve means is fully open so that if said first inlet valve means closes when said valve member is in said dead center position, the flow of fluid from said source through said restricted passage means will cause said valve member to complete its travel.

CLARENCE J. COBERLY.

REFERENCES CITED

The following references are of record in the file of this patent:

UNITED STATES PATENTS

| Number | Name | Date |
|---|---|---|
| 1,879,262 | Hubbard | Sept. 27, 1932 |
| 2,311,157 | Coberly | Feb. 16, 1943 |